(12) United States Patent
Chaudhuri et al.

(10) Patent No.: US 9,191,974 B2
(45) Date of Patent: Nov. 17, 2015

(54) METHOD AND SYSTEM FOR SESSION ADMISSION CONTROL IN BROADBAND WIRELESS NETWORK

(71) Applicants: Saptarshi Chaudhuri, Bangalore (IN); Irfan Baig, Bangalore (IN); Subhodeep Sarkar, Kolkata (IN)

(72) Inventors: Saptarshi Chaudhuri, Bangalore (IN); Irfan Baig, Bangalore (IN); Subhodeep Sarkar, Kolkata (IN)

(73) Assignee: WIPRO LIMITED, Bangalore (IN)

( * ) Notice: Subject to any disclaimer, the term of this patent is extended or adjusted under 35 U.S.C. 154(b) by 248 days.

(21) Appl. No.: 13/751,546

(22) Filed: Jan. 28, 2013

(65) Prior Publication Data

US 2014/0105059 A1 Apr. 17, 2014

(30) Foreign Application Priority Data

Oct. 12, 2012 (IN) .......................... 4266/CHE/2012

(51) Int. Cl.
*G01R 31/08* (2006.01)
*H04W 76/02* (2009.01)
*H04L 12/54* (2013.01)
*H04W 76/06* (2009.01)
*H04Q 11/04* (2006.01)

(52) U.S. Cl.
CPC ........... *H04W 76/02* (2013.01); *H04L 12/5602* (2013.01); *H04W 76/066* (2013.01); *H04Q 11/0478* (2013.01)

(58) Field of Classification Search
CPC ................................................. H04Q 11/0478
See application file for complete search history.

(56) References Cited

U.S. PATENT DOCUMENTS

| 8,014,280 | B2 | 9/2011 | Zhang et al. | |
|---|---|---|---|---|
| 8,040,803 | B1 | 10/2011 | Pawar et al. | |
| 8,099,102 | B2 | 1/2012 | Ishii et al. | |
| 2005/0005021 | A1* | 1/2005 | Grant et al. | 709/232 |
| 2009/0086629 | A1* | 4/2009 | Zhang et al. | 370/230 |
| 2011/0128845 | A1 | 6/2011 | Wu | |
| 2011/0267944 | A1 | 11/2011 | Stjernholm et al. | |
| 2011/0305137 | A1* | 12/2011 | Chu et al. | 370/230 |

FOREIGN PATENT DOCUMENTS

| CN | 102036293 A | 4/2011 |
|---|---|---|
| CN | 102333352 A | 1/2012 |
| CN | 102378261 A | 3/2012 |

* cited by examiner

*Primary Examiner* — Samina Choudhry
(74) *Attorney, Agent, or Firm* — Finnegan, Henderson, Farabow, Garrett & Dunner, LLP (57) ABSTRACT

A method and system for providing session admission control for a new session in a broadband wireless network is provided. The method may include obtaining a guaranteed bit rate, a priority level, and a quality of service class indicator for the new session. The method may further include calculating an available capacity by utilizing the guaranteed bit rate. The method may further include searching through existing sessions for a first plurality of existing sessions having same quality of service class indicator as the new session and priority level lower than the priority level for the new session, if the available capacity is found to be a negative value. The method may further include filtering the first plurality of existing sessions to obtain a second existing session, preempting the second existing session, and admitting the new session in response to the preempting.

18 Claims, 6 Drawing Sheets

METHOD AND SYSTEM FOR SESSION ADMISSION CONTROL IN BROADBAND WIRELESS NETWORK

CROSS-REFERENCE TO RELATED PATENT APPLICATIONS

The present application claims priority under 35 U.S.C. §119 to Indian Patent Application No. 4266/CHE/2012, filed Oct. 12, 2012, and entitled "METHOD AND SYSTEM FOR SESSION ADMISSION CONTROL IN BROADBAND WIRELESS NETWORK." The aforementioned application is incorporated herein by reference in its entirety.

TECHNICAL FIELD

The disclosure generally relates to wireless networks, and more particularly to session admission control in broadband wireless networks.

BACKGROUND

Mobile devices have moved from simple voice communication to performing functions traditionally performed by larger devices such as laptops and desktop computers. Such functions include streaming multimedia content, enabling high definition online gaming, and the like. These functions have become an integral part of our daily lives, but each of these and other functions enabled by mobile devices multiplies the bandwidth required for each user. Therefore, wireless network designs have built-in intelligence to determine how, when, and whether to grant access to a given user to connect with the network and begin communication. This intelligence is sometimes referred to as call admission control.

An example of a wireless broadband network which has such call admission control is Long-Term Evolution (LTE). LTE is an end-to-end broadband IP network that aims to provide high sector capacity, scalability, improved end-user throughputs, and reduced user plane latency, bringing significantly improved user experience with full mobility. However, the capacity of the LTE network is limited. Accordingly, mobile operators face a delicate balancing act in trying to manage the high speed data traffic desired by its users, and maintaining the subscriber's quality of experience by providing a selective session call admission control mechanism.

An exemplary call admission control technique is illustrated in U.S. Publication No. 2011/0305137 to Chu et al. The '137 publication suggests using policy based admission control for a LTE network shared between a public safety user class and a consumer user class. However, the approach suggested by the '137 publication may be either too simplistic to handle complex traffic session admission control needs of modern day applications in the LTE network, or may lead to instability or overloading of the system.

Accordingly, there exists a need for techniques for an improved call admission control in wireless broadband networks such as LTE.

SUMMARY

According to an exemplary embodiment, a method for providing session admission control for a new session in a broadband wireless network is provided. The method may include obtaining a guaranteed bit rate, a priority level, and a quality of service class indicator for the new session. The method may further include calculating an available capacity by utilizing the guaranteed bit rate. The method may further include searching through existing sessions for a first plurality of existing sessions having same quality of service class indicator as the new session and priority level lower than the priority level for the new session, if the available capacity is found to be a negative value. The method may further include filtering the first plurality of existing sessions to obtain a second existing session, preempting the second existing session, and admitting the new session in response to the preempting.

According to another exemplary embodiment, a system for implementing session admission control for a new session in a broadband wireless network is provided. The system may include a hardware processor and a memory storing instructions for execution by the hardware processor. The hardware processor may be configured by the instructions to obtain a guaranteed bit rate, a priority level, and a quality of service class indicator for the new session. The hardware processor may be further configured by the instructions to calculate an available capacity by utilizing the guaranteed bit rate and determine whether the available capacity is a negative or a positive value. The hardware processor may be further configured by the instructions to search through existing sessions for a first plurality of existing sessions having same quality of service class indicator as the new session and priority level lower than the priority level for the new session, if the available capacity is a negative value. The hardware processor may be further configured by the instructions to filter the first plurality of existing sessions to obtain a second existing session, in response to finding the first plurality of existing sessions. The hardware processor may be further configured by the instructions to preempt the second existing session and admit the new session in response to the preempting.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Now, exemplary embodiments of the present disclosure will be described with reference to the accompanying drawings. Wherever possible, the same reference numbers will be used throughout the drawings to refer to the same or like parts. While exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

Figure 1:
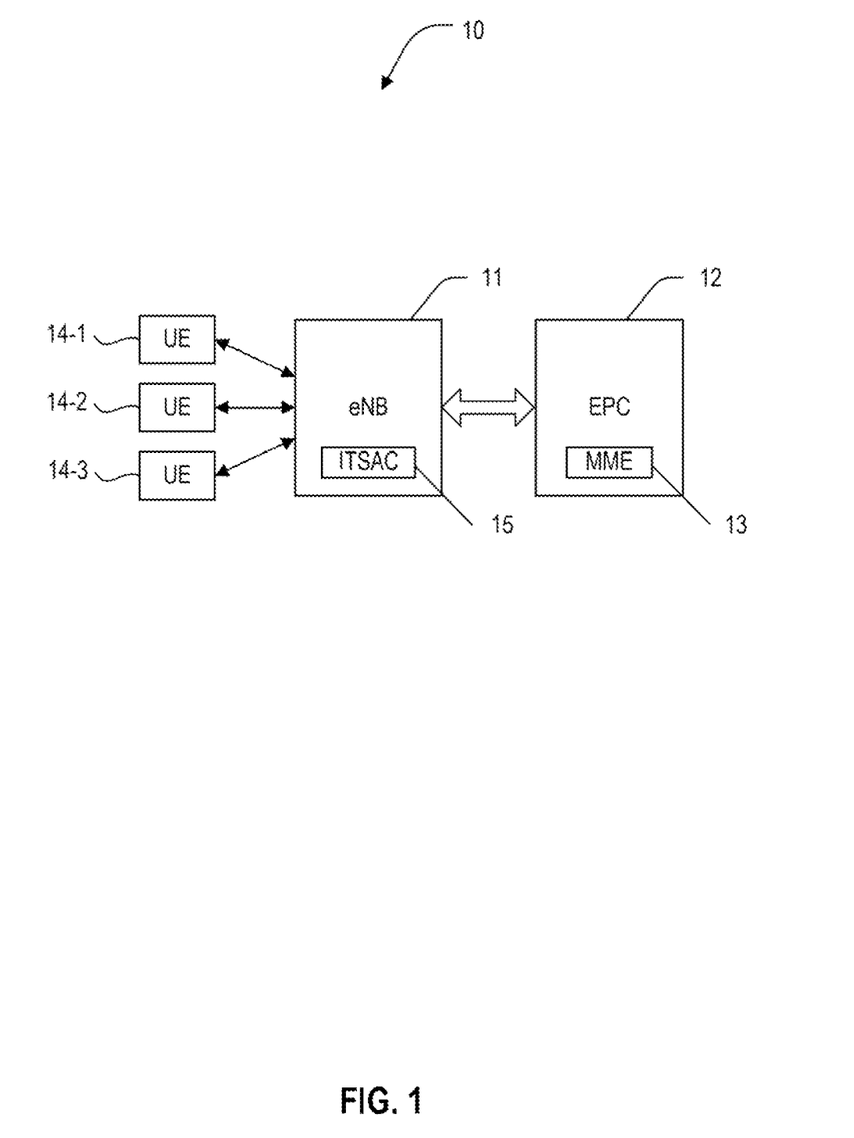
FIG. 1 illustrates an exemplary network architecture for a broadband wireless network.

An exemplary high level network 10 depicting a broadband wireless network architecture is illustrated in FIG. 1. For purposes of illustration, the network 10 corresponds to an LTE network. However, the depicted LTE network is merely an exemplary network, and thus it will be understood that the teachings of the disclosure could well be extended to other broadband wireless networks such as WiMax, High Speed Packet Access (3GPP's HSPA), etc.

In FIG. 1, one or more of LTE user equipments (UE) 14-1, 14-2, and 14-3 (hereinafter referred to as UE 14) may communicate wirelessly with an evolved nodeB (eNB) 11 that is an LTE base station. An example of a UE may be a cell phone, PDA, tablet computer, etc. The eNB 11 may communicate with an evolved packet core (EPC) 12 that may include a mobility management entity (MME) 13. The functionalities of eNB may include Radio Resource Management (RRM), header compression and encryption of user data stream, packet scheduling and transmission, physical layer processing, etc. The MME may be responsible for EPS (Evolved Packet System) Session Management (ESM), EPS Mobility Management (EMM), EPS Connection Management (ECM), Ciphering and Integrity Protection, Inter core network signaling, SAE (System Architecture Evolution) bearer control, Handover, etc. The EPC 12 may also include a serving gateway (SGW) (not shown) and packet-data network gateway (PDN GW) (not shown). The combined functionalities may include SGW and PDN GW include Lawful Interception, Packet routing and forwarding, Transport Level packet marking in the uplink and the downlink, Packet filtering, Mobile IP, Policy enforcement, etc.

The admission control from the LTE network infrastructure point of view can be broadly categorized as
(1) Initial Random Access admission control at eNB;
(2) UE Signaling session admission control at MME; and
(3) Traffic session admission control at eNB.

Initial Random Access admission control is the first level of admission control where the eNB 11 may decide whether to initiate a communication path with the UE 14. Once this Initial Random Access admission control is complete, UE 14 may send the next set of signaling messages to the MME 13 via the eNB 11 where UE Signaling session admission control may be performed based on multiple factors and parameters. Once the MME 13 accepts the UE Signaling session admission control, then eNB 11 may execute the Traffic session admission control and finally decide whether to admit the UE 14 for transmitting and receiving traffic through the eNB 11. An effective traffic session admission control executed at the eNB 11 may ensure good traffic data throughput in the network for specific user applications, along with minimum packet delay and packet loss rate in the air interface (not shown) following the eNB 11.

To provide an improved Traffic session admission control in the eNB 11, an exemplary Improved Traffic Session Admission Control (ITSAC) 15 may be provided in the eNB 11. While FIG. 1 illustrates that the ITSAC 15 may be provided in the eNB 11, ITSAC may be provided separately from eNB 11. An exemplary implementation of the ITSCAC 15 is illustrated in FIG. 2.

Figure 2:
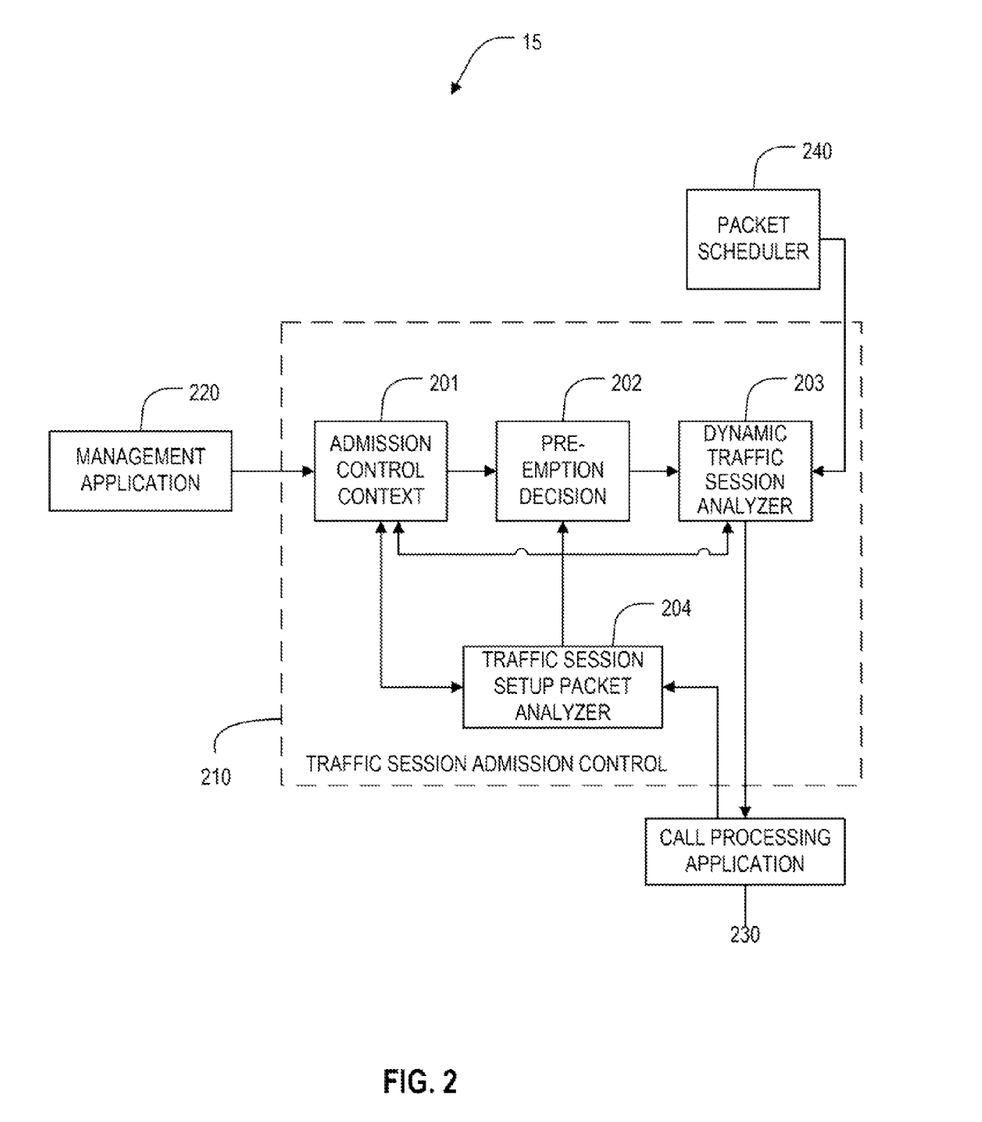
FIG. 2 illustrates an exemplary component in a base station that performs admission control.

As shown in FIG. 2, the ITSAC 15 may include a traffic session admission control (TSAC) module 210, a management application module 220, a call processing application module 230, and a packet scheduler module 240. Exemplarily, the TSAC module 210 may provide an intelligent traffic session admission control for admission requests from UE 14 and the bulk of this disclosure will be dedicated to explaining exemplary features of the TSAC module 210. The management application module 220 may allow the operator or manager of the eNB 11 to specify certain parameters for the eNB 11 that are stored in the admission control context module 201 of the TSAC 210.

The call processing application module 230 may receive signaling packets from the MME 13 and after performing a sanity check on the signaling packets, the call processing application module 230 may pass on the signaling packets to the TSAC 210 for admission control analysis and pre-emption analysis. The sanity check may involve involves doing a brief check on the ordering of mandatory parameters and examining the consistency and evenness of the parameter values. In particular, the call processing application module 230 may receive an E-RAB (E-UTRAN Radio Access Bearer) setup message from the MME 13 and forward the E-RAB setup message to the TSAC 210. The E-RAB set up message refers to a session setup request from the MME 13 to setup a new session for the UE 14, which is requesting admission to the eNB 11 so that it may transfer and receive data through the eNB 11.

The packet scheduler module 240 may calculate eNB 11 specific parameters such as Average Packet Drop Rate (PDR) per QCI, Average Scheduling Delay per QCI, Average Throughput per QCI, and the like, where QCI stands for Quality of Service Class Identifier. QCI is a scalar value that may be associated with the type of data to be transmitted or the type of call; for example, a certain QCI value may be assigned to a video transmission, a different QCI value may be assigned to Voice over IP (VOIP) call, and another QCI value may be assigned to a web browsing session. The packet scheduler module 240 may analyze the various sessions currently supported by the eNB 11, group them by their respective QCIs, and calculate the Average PDR, Average Scheduling Delay, Average Throughput per QCI and the like based on the analysis. Exemplarily, the packet scheduler module 240 may calculate these values repeatedly after a predetermined amount of time such as 1 ms, 2 ms, etc. Next, a detailed description of the TSAC 210 is provided.

The TSAC 210 may include an admission control context module 201, a pre-emption decision module 202, a dynamic traffic session analyzer module 203, and a traffic session setup analyzer module 204. Each of these modules will be explained in further detail next.

Admission Control Context Module 201

The admission control context module 201 may store parameters that are utilized by other modules of the TSAC 210 to perform admission control. The parameters stored in the admission control context module 201 may be classified into 3 broad categories.
   a. Configuration parameters
     i. Guaranteed Bit Rate (GBR) per QCI
     ii. Maximum Throughput in Downlink direction
     iii. Minimum Throughput per QCI
     iv. Hysteresis Throughput per QCI
     v. Packet Drop Rate (PDR) per QCI
     vi. Hysteresis Packet Drop Rate per QCI
     vii. Scheduling Delay per QCI
     viii. Hysteresis Scheduling Delay per QCI
     ix. Operator's priority between Highest PDR and Highest Scheduling Interval
     x. ITSAC Enabler b. User Context(s)
   i. QCI
   ii. Priority Level
   iii. Pre-emption Capability
   iv. Pre-emption Vulnerability
   v. GBR QoS Information
c. Global Data
   i. Average Packet Drop Rate per QCI
   ii. Average Scheduling Delay per QCI
   iii. Average Throughput per QCI The configuration parameters may be set by the operator of the eNB 11 through management application module 220. Many of the configuration parameters (GBR per QCI, Maximum Throughput in Downlink Direction, Minimum Throughput per QCI) are well known to one of ordinary skill in the art as they are defined in the 3GPP standard. The ITSAC Enabler is a turn on/off setting which may be set by the operator to turn ON/OFF the operations of the ITSAC 15.

The user context parameters are E-RAB level Quality of Service parameters that are specific to various sessions currently administered by the eNB 11 and these parameters are also defined in the 3GPP standard. These E-RAB level parameters may be retrieved by traffic session setup analyzer module 204 from the E-RAB set up messages sent by MME 13. The traffic session setup analyzer module 204 may store these parameters in admission control context module 201. These parameters may include the QCI and priority level of the session. They may also include the "Pre-emption Capability" parameter, which indicates whether the associated session is capable of preempting other active sessions, and the "Pre-emption Vulnerability" parameter, which indicates if the associated session can be preempted by other sessions. They may further include GBR Quality of Service information (GBR QoS) for the session.

The Global Data parameters (Average PDR per QCI, Average Scheduling Delay per QCI, Average Throughput per QCI) are parameters specific to the current conditions of eNB 11 that may be calculated by packet scheduler module 240. These parameters may be analyzed by dynamic traffic session analyzer module 203 and stored in admission control context module 201.

Pre-Emption Decision Module 202

The pre-emption decision module 202 may decide on a final target list of the eNB 11's existing session(s) which may be pre-empted for allowing admission of the new session requested by UE 14. The pre-emption decision module 202 may utilize parameters such as Highest PDR, Highest Scheduling Interval, and Pre-emption Vulnerability for the existing session(s) to prepare the pre-emption list.

Dynamic Traffic Session Analyzer Module 203

The dynamic traffic session analyzer module 203 may retrieve from the packet scheduler 240 the Global data parameters after a predetermined amount of time (for example, 1 ms). The dynamic traffic session analyzer module 203 may also inform call processing application module 230 to pre-empt (if any) one or more of the eNB 11's existing session(s) for allowing admission of the new session requested by UE 14. The dynamic traffic session analyzer module 203 may also inform call processing application module 230 to allow/reject the admission of the new session requested by the UE 14.

Traffic Session Setup Packet Analyzer Module 204

The traffic session setup analyzer module 204 may analyze E-RAB setup specific messages like Initial Context Setup Request, E-RAB Setup Request or Handover Requests coming from the EPC 12. The traffic session setup analyzer module 204 may retrieve E-RAB Level QoS Parameters (User Context parameters discussed above) from the received E-RAB setup messages and store them in admission control context module 201.

Next, a detailed machine algorithm is presented with reference to FIGS. 3A, 3B, 3C, and 3D for describing exemplary functions of ITSAC 15 for call admission control. In S301, an E-RAB setup message may be received by ITSAC 15 (in eNB 11) from MME 13. The E-RAB setup message may be a session setup request message for admitting a new session associated with UE 14. The E-RAB setup message may be analyzed by call processing application module 230 and forwarded to traffic session setup analyzer module 204.

Figure 3A:
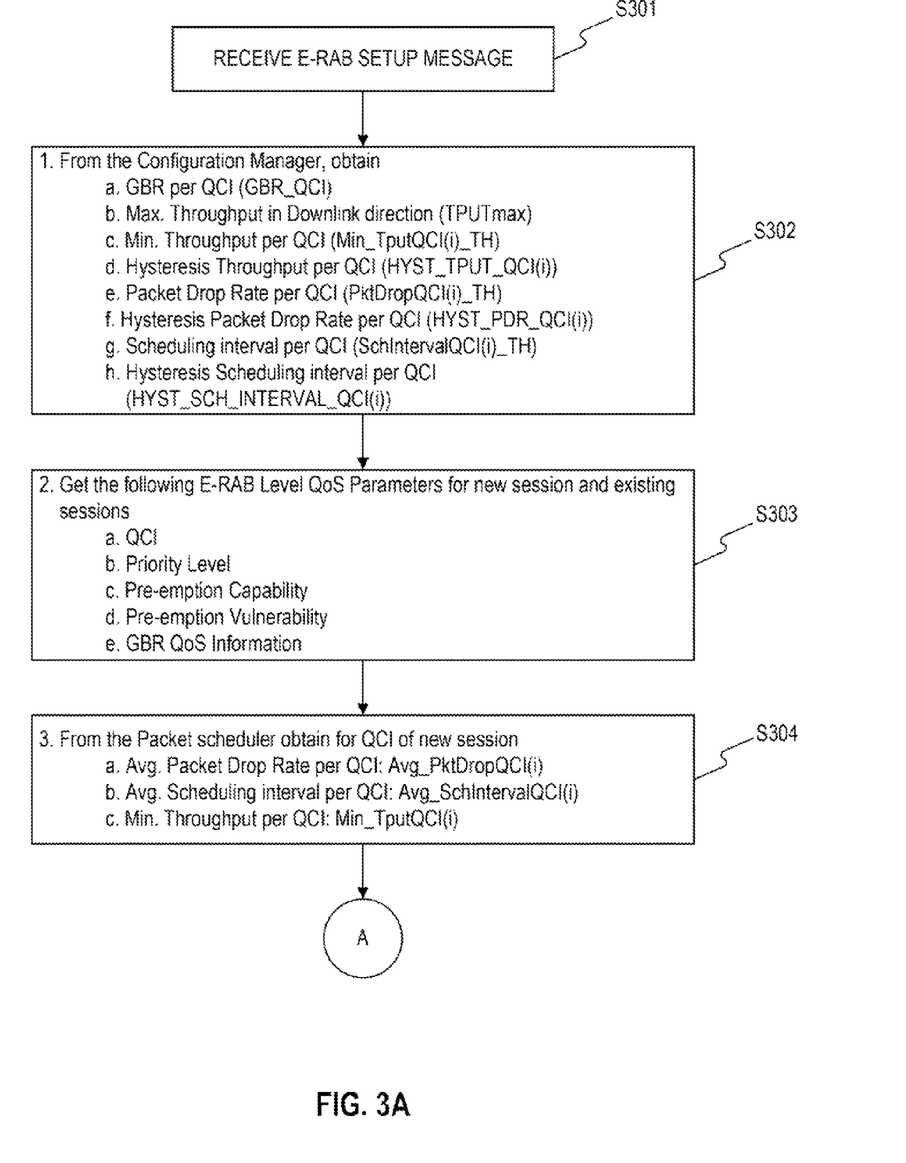
FIG. 3A is an exemplary machine algorithm for call admission control.

The E-RAB setup message may include a QCI for the new session that may be utilized by admission control context module 201 to retrieve from its configuration manager (not shown) certain parameters related to the QCI. The QCI for the new session requested by UE 14 will be referred hereinafter as QCI(i). In particular, in S302, admission control context module 201 may retrieve the following parameters:
   a. GBR per QCI (GBR_QCI)
   b. Max. Throughput in Downlink direction (TPUTmax)
   c. Min. Throughput per QCI (Min_TputQCI(i)_TH)
   d. Hysteresis Throughput per QCI (HYST_TPUT_QCI(i))
   e. Packet Drop Rate per QCI (PktDropQCI(i)_TH)
   f. Hysteresis Packet Drop Rate per QCI (HYST_PDR_QCI (i))
   g. Scheduling interval per QCI (SchIntervalQCI(i)_TH)
   h. Hysteresis Scheduling interval per QCI (HYST_SCHINTERVAL_QCI(i))

The parameters TPUTmax and GBR_QCI are not specific to QCI(i) but are general parameters of the eNB 11 that may be set by the operator of the eNB 11. GBR_QCI refers to a list or table of GBR values for different QCIs.

In S303, traffic session setup analyzer module 204 may retrieve from the received E-RAB setup message, the following parameters for the new session requested by UE 14:
   a. QCI
   b. Priority Level
   c. Pre-emption Capability
   d. Pre-emption Vulnerability
   e. GBR QoS Information The traffic session setup analyzer module 204 may also retrieve the above parameters for the current/existing sessions of eNB 11 from admission control context module 201.

In S304, traffic session setup analyzer module 204 may retrieve the following parameters from packet scheduler 240 for QCI(i):
   a. Avg. Packet Drop Rate per QCI: Avg_PktDropQCI(i)
   b. Avg. Scheduling interval per QCI: Avg_SchIntervalQCI (i)
   c. Min. Throughput per QCI: Min_TputQCI(i)

Figure 3B:
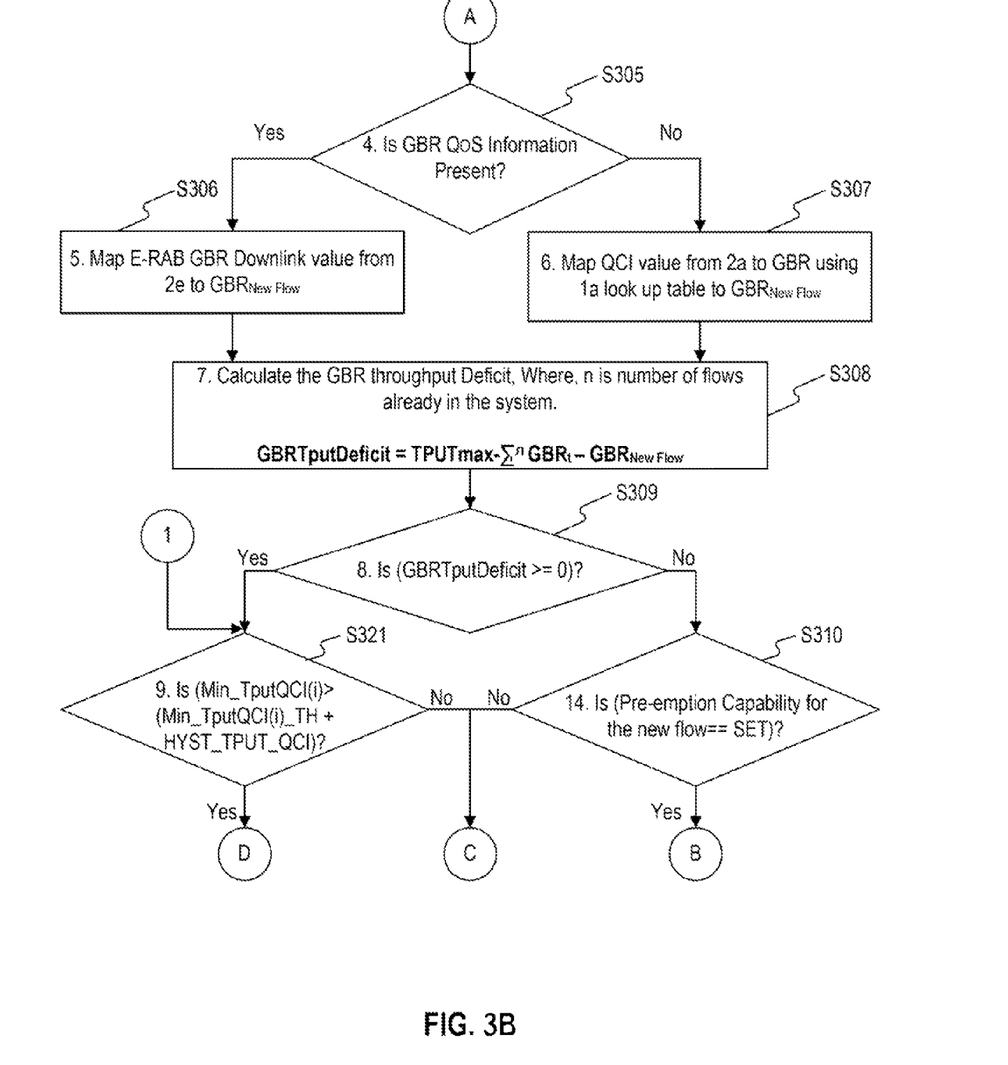
FIG. 3B is a continuation of the machine algorithm of FIG. 3A setting forth additional exemplary steps.

Next, traffic session setup analyzer module 204 may determine whether eNB 11 has capacity to admit the new session. Turning now to FIG. 3B, in S305, traffic session setup analyzer module 204 may check whether GBR QoS information is present in the E-RAB setup message received from the MME for the new session. If GBR QoS information for the new session is present in the received E-RAB setup message traffic session setup analyzer module 204 may map GBR QoS information to $GBR_{NewFlow}$ (S306). However, if GBR QoS information for the new session is not present in the received E-RAB setup message, traffic session setup analyzer module 204 may utilize the QCI value of the new session (in this exemplary embodiment QCI(i)) to look up the GBR (S307)

for QCI(i) from S302. Exemplarily, traffic session setup analyzer module 204 may refer to the GBR_QCI table in admission control context module 201 to determine a GBR value for QCI(i) and map the same to $GBR_{NewFlow}$.

In S308, traffic session setup analyzer module 204 may determine whether capacity exists in eNB 11 to admit the new session by calculating a GBR Throughput Deficit (GBRTputDeficit) using the following equation:

$$GBRTputDeficit = TPUTmax - \Sigma_1^n GBR_i - GBR_{NewFlow}$$

In the above equation, TPUTmax was retrieved from admission control context module 201, and n is the number of existing sessions administered by eNB 11. In the equation, $GBR_{NewFlow}$ and the sum of GBRs for existing sessions is subtracted from TPUTmax that is the maximum throughput of eNB 11 in the downlink direction.

In S309, traffic session setup analyzer module 204 may determine whether GBRTputDeficit is a positive or negative value. A positive value would indicate that eNB 11 has not exhausted all of its capacity and may be able to admit the new session. A negative value would indicate that eNB 11 does not have enough capacity to admit the new session and that certain existing sessions will have to be preempted in order to admit the new session. How the eNB 11 or ITSAC 15 may decide whether to admit or deny the new session and which session(s) to preempt is described next.

If in S309, traffic session setup analyzer module 204 determines that GBRTputDeficit is a positive value, control may be passed to dynamic traffic session analyzer module 203 for further calculations to ensure that eNB 11 is not overloaded in the QCI category for the new session. For example, if the QCI value for the new session corresponds to a video call, dynamic traffic session analyzer module 203 may determine whether eNB 11 is servicing too many video calls that may be putting a strain on the eNB resources. In such a scenario, where certain precautionary limits set by the operator of the eNB 11 are being violated or would be violated if the new session is admitted, the new session may be rejected in spite of eNB 11 having additional capacity to admit the new session. Whether these precautionary limits are being exceeded may be checked in S321, S322, and S323 (described in further detail below).

If in S309, it is determined that GBRTputDeficit is a negative value, certain existing sessions may have to be preempted in order to admit the new session. In S310, pre-emption decision module 202 may determine whether the new session has the capability to preempt other sessions and if not, the new session may be rejected in S320. Whether the new session has the capability to preempt other sessions may determined by checking whether the Pre-emption Capability flag is set for the new session in the E-RAB level QoS parameters retrieved from the E-RAB setup message for the new session. If the Pre-emption Capability flag is set, pre-emption decision module 202 may determine that the new session has pre-emption capability and control may proceed to S311.

Figure 3C:
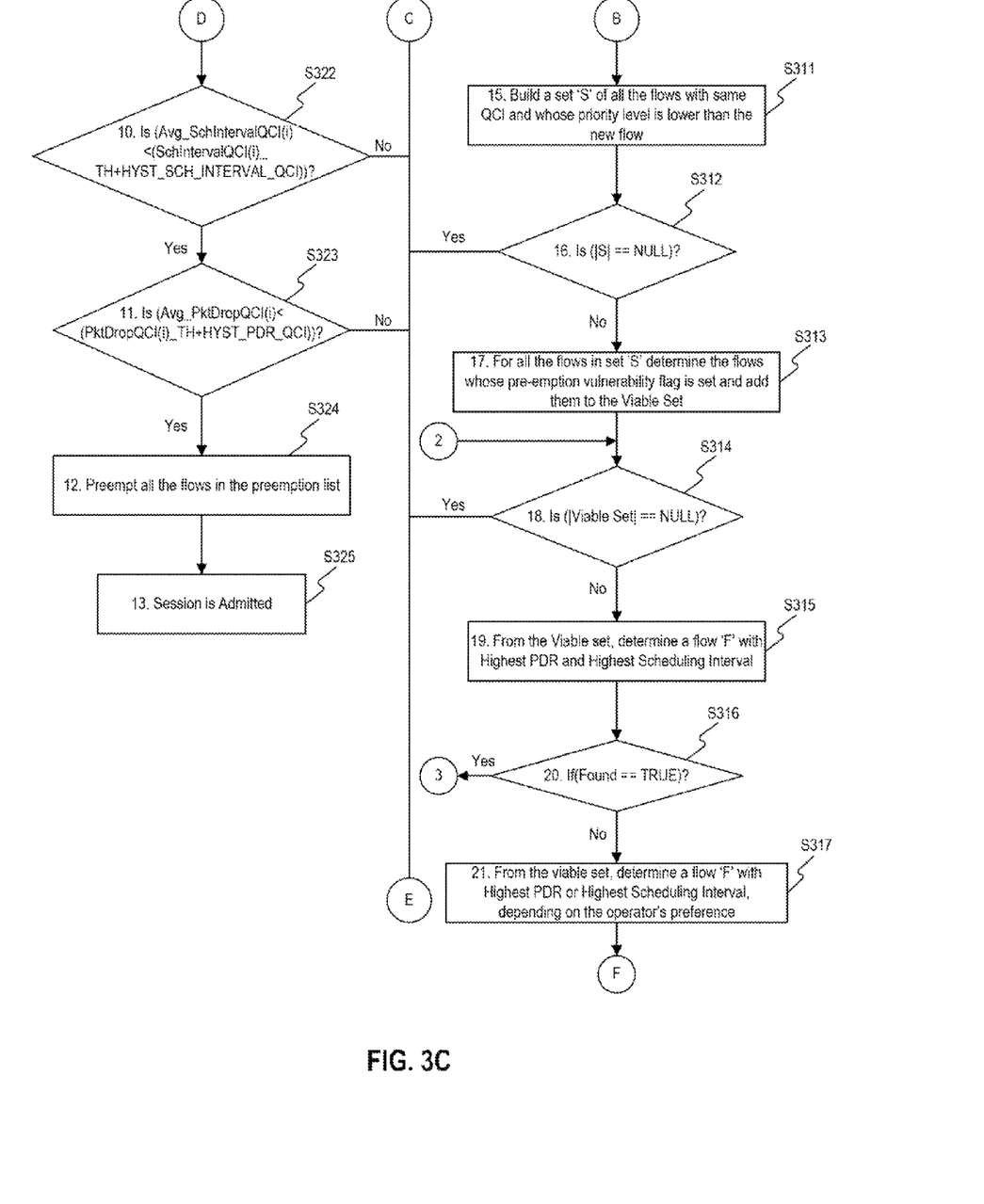
FIG. 3C is a further continuation of the machine algorithm of FIG. 3A setting forth additional exemplary steps.

Turning now to FIG. 3C, in S311, pre-emption decision module 202 may build a set 'S' of all existing sessions of eNB 11 that have the same QCI value as the new session, i.e., QCI(i), and whose priority level (see 2b in S303) is lower than the priority level of the new session. The priority level of the new session was previously retrieved by traffic session setup analyzer module 204 in S303 and the priority level of existing sessions having QCI(i) may be retrieved from admission control context module 201.

In S312, pre-emption decision module 202 may determine whether the set 'S' is null. If 'S' is null, pre-emption decision module 202 may inform call processing application module 230 to reject the new session (S320) (See FIG. 3D). If 'S' is not null, pre-emption decision module 202 may determine sessions in set 'S' whose Pre-emption Vulnerability flag is set and add those sessions to a viable set (S313). As discussed earlier, the Pre-emption Vulnerability flag indicates whether a particular session can be preempted. In S314, pre-emption decision module 202 may determine whether the viable set is null. If the viable set is determined to be null, pre-emption decision module 202 may inform call processing application module 230 to reject the new session (S320). If the viable set is not null in S314, processing may continue to S315.

In S315, pre-emption decision module 202 may determine for the sessions in the viable set the session with the highest PDR and highest scheduling interval. The PDR and scheduling intervals for each of the sessions may be obtained from packet scheduler module 240, admission control context module 201, or another database where such information may be stored. A scheduling interval may refer to the time taken between two successive scheduling decisions of a flow, where flow in turn refers to a call or session with some associated QCI. In certain exemplary embodiments, one or both the PDR and scheduling intervals may be obtained.

In S316, pre-emption decision module 202 may check if there exists a session 'F' in the viable set that has both the highest PDR and the highest scheduling interval from among all the sessions in the viable set. If such a session exists, the session 'F' may be selected for further processing in S318 (See FIG. 3D). If pre-emption decision module 202 determines in S316 that such a session does not exist, pre-emption decision module 202 may select in S317 a session 'F' from the viable set that has the highest PDR or the highest scheduling interval and processing may continue to S318. Whether to select a session with highest PDR or to select a session with highest scheduling interval may be based on a preference set by the operator of the eNB 11.

Figure 3D:
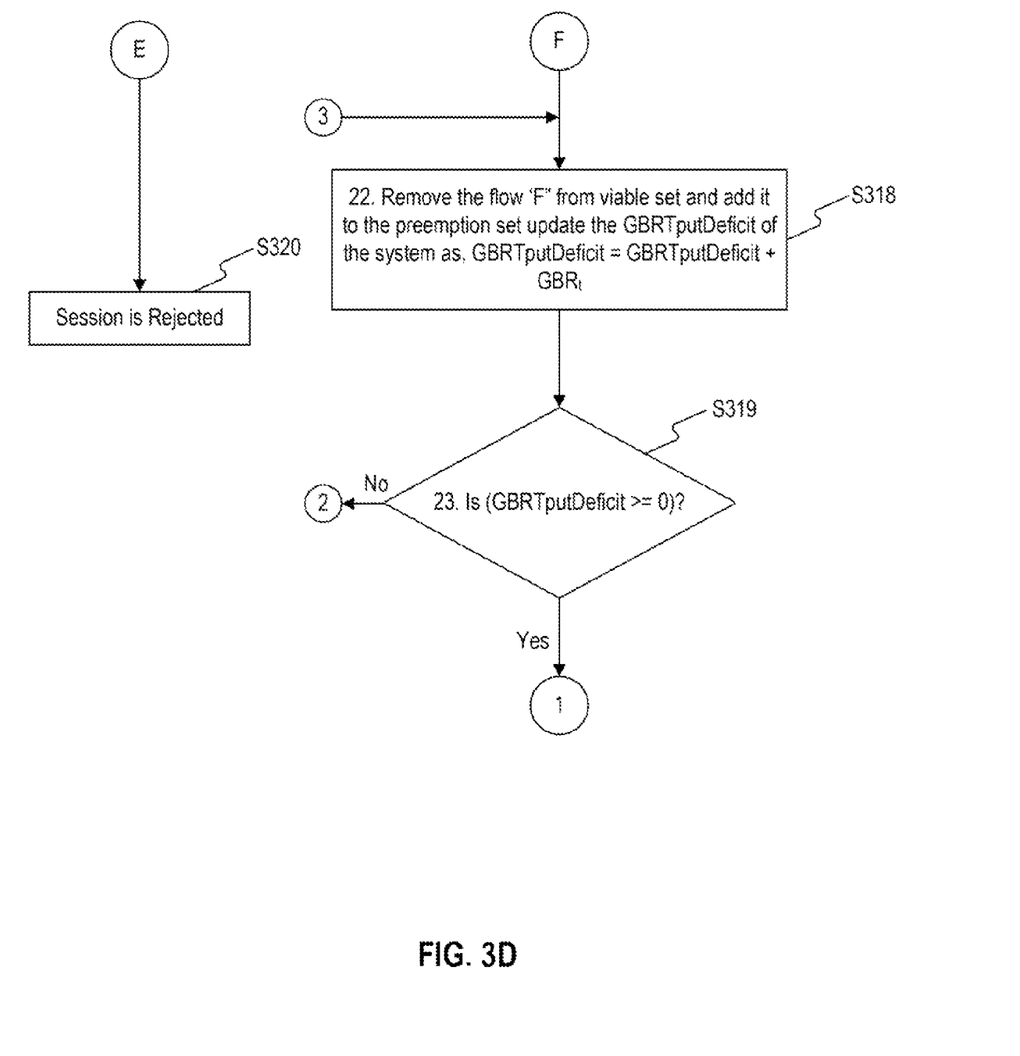
FIG. 3D is an even further continuation of the machine algorithm of FIG. 3A setting forth additional exemplary steps.

Turning now to FIG. 3D, in S318 pre-emption decision module 202 may remove the session 'F' from the viable set, add the selected session 'F' to a preemption set, and determine the effect of preempting the session 'F' on the available capacity of eNB 11. For example, pre-emption decision module 202 may obtain the GBR QoS for flow 'F' from admission control context module 201 and add it to GBRTputDeficit calculated in S308 to obtain an updated GBRTputDeficit. In S319, pre-emption decision module 202 may check whether the updated GBRTputDeficit is greater than zero. If the updated GBRTputDeficit is not greater than zero, pre-emption decision module 202 may decide to add additional sessions 'F' from the viable set to the preemption set until the updated GBRTputDeficit becomes greater than zero. To add additional sessions 'F,' pre-emption decision module 202 may return to S314 and process S314-S319 again by picking another session in the viable set.

Turning back to FIG. 3C, once pre-emption decision module 202 determines a preemption set, which if preempted, may provide sufficient additional capacity to eNB 11 to admit the new session, pre-emption decision module 202 may provide the preemption set to dynamic traffic session analyzer module 203 for further processing in S321-S323. In certain exemplary embodiments, however, pre-emption decision module 202 may provide the preemption set to the call processing application module 230, which may preempt the sessions in the preemption set and admit the new session without dynamic traffic session analyzer module 203 processing S321-323. That is, in certain exemplary embodiments, S321-S323 may not be carried out once a preemption set is determined by pre-emption decision module 202.

In S321-S323, dynamic traffic session analyzer module 203 may determine whether current performance in eNB 11 for sessions with QCI(i) is acceptable according to certain predetermined criteria. Exemplarily, the predetermined criteria may be defined by the operator of eNB 11. Examples of predetermined criteria may be found in S321-S323. One criteria may be whether minimum throughput (Min_TputQCI(i)) for sessions with QCI(i) is greater than the sum of a threshold minimum throughput (Min_TputQCI(i)_TH) for QCI(i) set by the operator and a hysteresis value (HYST_TPUT_QCI(i)) for QCI(i) set by the operator. Other criteria may be whether the current average scheduling interval (Avg_SchIntervalQCI(i)) for QCI(i) as determined by packet scheduler module 240 is less than the sum of a threshold scheduling interval (SchIntervalQCI(i)_TH) for QCI(i) set by the operator and a hysteresis value (HYST_SCH_INTERVAL_QCI(i)) for QCI(i). Another criteria may be whether the current average packet drop rate for sessions with QCI(i) as determined b packet scheduler module 240 is less than the sum of a threshold packet drop rate (PktDropQCI(i)_TH) for QCI(i) set by the operator and a hysteresis value (HYST_PDR_QCI(i)) for QCI(i).

Exemplarily, dynamic traffic session analyzer module 203 may check one or more of the above criteria in S321-S323 and if the criteria are found to be not satisfied, dynamic traffic session analyzer module 203 may inform call processing application module 230 to reject the new session in spite of the presence of a list of sessions in the preemption set that can be preempted. It will be noted that the order of S321-S323 is only provided as an example and in certain exemplary embodiments, the order of S321-S323 may be changed as may the order of any steps shown in FIGS. 3A-3D.

If the criteria in S321-S323 is satisfied, dynamic traffic session analyzer module 203 may inform call processing application module 230 to preempt the sessions in the preemption set in S324 and admit the new session in S325. Following these steps, control may return to S301 or another intermediate step such as S302 for processing a request to admit another new session.

While an exemplary machine algorithm has been described with reference to FIGS. 3A, 3B, 3C, and 3D, it will be understood that certain exemplary embodiments may change the order of steps in the machine algorithm or may even eliminate or modify certain steps. For example, an exemplary embodiment may modify S315 to check only one of the highest PDR and highest scheduling interval. In another exemplary embodiment, S313 and S314 may be eliminated such that control directly proceeds from S312 to S315 with the set 'S' utilized as the viable set. Other variations to the exemplary machine algorithm set forth in FIGS. 3A-3D will be apparent to a skilled artisan.

The different components of ITSAC 15 (FIG. 2) may be embodied in hardware or software or a combination of both. The hardware may include a general-purpose computer having a central processing unit (CPU) and memory/storage devices that store data and various programs such as an operating system and one or more application programs. Furthermore, each of the steps in the machine algorithm described in FIGS. 3A-3D may be embodied as computer-readable instructions or code and stored in a computer-readable storage medium for execution by a computer.

Other embodiments of the present disclosure will be apparent to those skilled in the art from consideration of the specification and practice of the embodiments disclosed herein. It is intended that the specification and examples be considered as exemplary only, with a true scope and spirit of the disclosure being indicated by the following claims.

What is claimed is:

1. A method of providing session admission control for a new session in a broadband wireless network, the method comprising:
   obtaining, by one or more hardware processors, a guaranteed bit rate, a priority level, and a quality of service class indicator for the new session;
   calculating an available capacity by utilizing the guaranteed bit rate;
   determining, by the one or more hardware processors, whether the available capacity is a negative or a positive value;
   in response to the available capacity being a negative value, searching through existing sessions for a first plurality of existing sessions having same quality of service class indicator as the new session and priority level lower than the priority level for the new session;
   in response to finding the first plurality of existing sessions, filtering the first plurality of existing sessions to obtain a second existing session, the filtering comprises:
      obtaining, for each of the first plurality of existing sessions, a corresponding packet drop rate and a corresponding scheduling interval; and
      selecting an existing session having the highest corresponding packet drop rate and the highest corresponding scheduling interval from among the first plurality of existing sessions as the second existing session;
   preempting, by the one or more hardware processors, the second existing session; and
   admitting, by the one or more hardware processors, the new session in response to the preempting.

2. The method of claim 1, further including rejecting the new session in response to not finding the first plurality of existing sessions that have the same quality of service class indicator as the new session and priority level lower than the priority level for the new session.

3. The method of claim 1, wherein calculating the available capacity includes:
   obtaining a maximum throughput in a downlink direction;
   obtaining guaranteed bit rates for the existing sessions; and
   calculating the available capacity by subtracting from the maximum throughput, the guaranteed bit rates for the existing sessions and the guaranteed bit rate for the new session.

4. The method of claim 1, wherein filtering the first plurality of existing sessions includes: determining a second plurality of existing sessions from the first plurality of existing sessions, each of the second plurality of existing sessions having a pre-emption vulnerability flag that is set and indicating that the session is capable of being pre-empted.

5. The method of claim 4, wherein filtering the first plurality of existing sessions further includes selecting the second existing session from the second plurality of existing sessions.

6. The method of claim 5, wherein selecting the second existing session from the second plurality of existing sessions includes: obtaining packet drop rates for each of the second plurality of existing sessions and selecting the second existing session based on the packet drop rates.

7. The method of claim 5, wherein selecting the second existing session from the second plurality of existing sessions includes: obtaining a scheduling interval for each of the second plurality of existing sessions and selecting the second existing session based on the scheduling intervals.

8. The method of claim 6, wherein the second existing session has the highest packet drop rate among the second plurality of existing sessions.

9. The method of claim 7, wherein the second existing session has the highest scheduling interval among the second plurality of existing sessions.

10. A system for implementing session admission control for a new session in a broadband wireless network, the system comprising:
a hardware processor; and
a memory storing instructions for execution by the hardware processor, wherein the hardware processor is configured by the instructions to:
obtain a guaranteed bit rate, a priority level, and a quality of service class indicator for the new session in a computer system;
calculate an available capacity of the computer system by utilizing the guaranteed bit rate;
determine whether the available capacity is a negative or a positive value;
in response to the available capacity being a negative value, search through existing sessions running on the computer system for a first plurality of existing sessions having same quality of service class indicator as the new session and priority level lower than the priority level for the new session;
in response to finding the first plurality of existing sessions, filter the first plurality of existing sessions to obtain a second existing session, the filtering comprises:
obtaining, for each of the first plurality of existing sessions, a corresponding packet drop rate and a corresponding scheduling interval; and
selecting an existing session having the highest corresponding packet drop rate and the highest corresponding scheduling interval from among the first plurality of existing sessions as the second existing session;
preempt the second existing session; and
admit the new session to the computer system in response to the preempting.

11. The system of claim 10, wherein the hardware processor is further configured by the instructions to reject the new session in response to not finding the first plurality of existing sessions that have the same quality of service class indicator as the new session and priority level lower than the priority level for the new session.

12. The system of claim 10, wherein calculating the available capacity includes:
obtaining a maximum throughput in a downlink direction;
obtaining guaranteed bit rates for the existing sessions; and
calculating the available capacity by subtracting from the maximum throughput, the guaranteed bit rates for the existing sessions and the guaranteed bit rate for the new session.

13. The system of claim 10, wherein filtering the first plurality of existing sessions includes: determining a second plurality of existing sessions from the first plurality of existing sessions, each of the second plurality of existing sessions having a pre-emption vulnerability flag that is set and indicating that the session is capable of being pre-empted.

14. The system of claim 13, wherein filtering the first plurality of existing sessions further includes selecting the second existing session from the second plurality of existing sessions.

15. The system of claim 14, wherein selecting the second existing session from the second plurality of existing sessions includes: obtaining packet drop rates for each of the second plurality of existing sessions and selecting the second existing session based on the packet drop rates.

16. The system of claim 14, wherein selecting the second existing session from the second plurality of existing sessions includes: obtaining a scheduling interval for each of the second plurality of existing sessions and selecting the second existing session based on the scheduling intervals.

17. The system of claim 15, wherein the second existing session has the highest packet drop rate among the second plurality of existing sessions.

18. The system of claim 16, wherein the second existing session has the highest scheduling interval among the second plurality of existing sessions.

* * * * *